Patented May 20, 1930

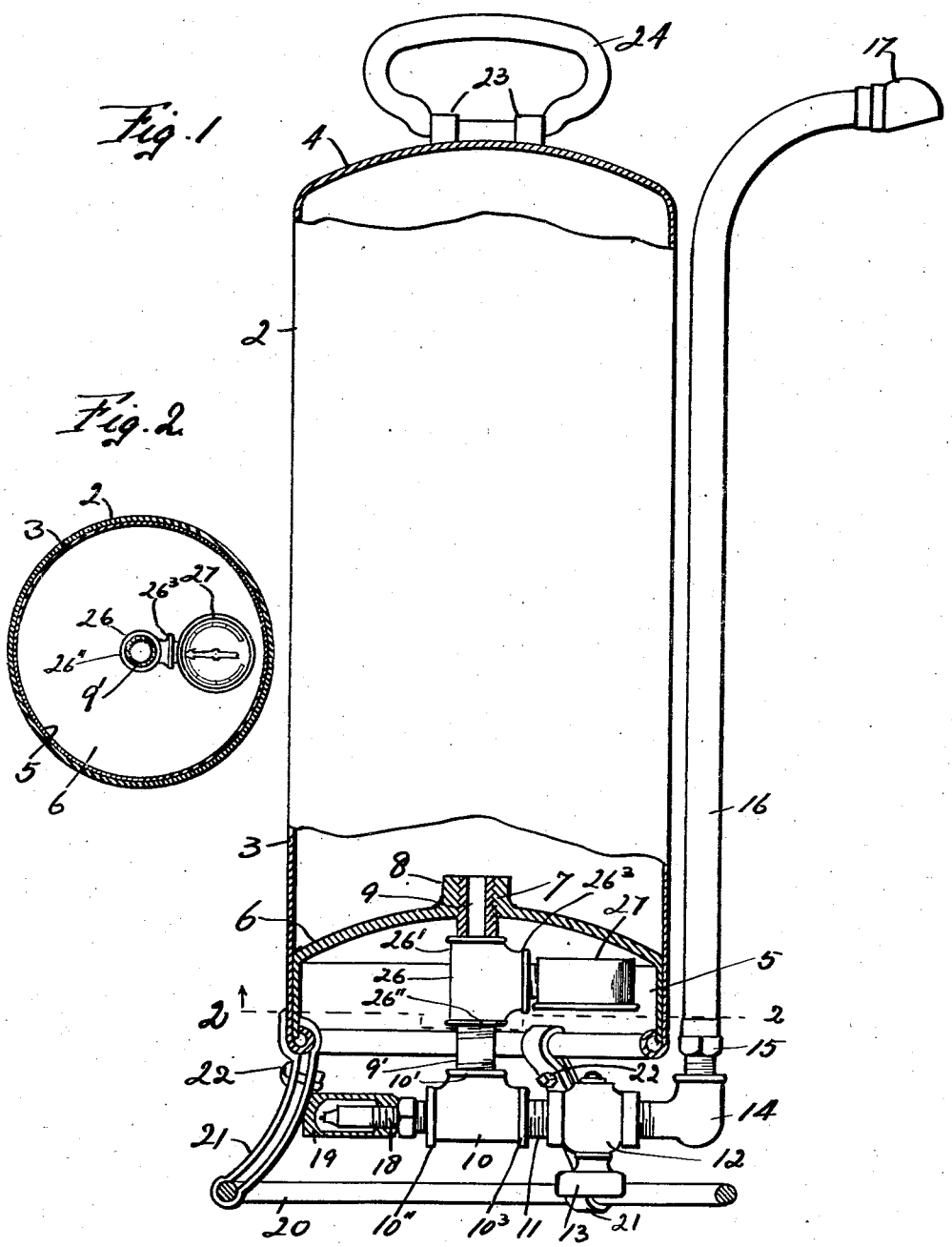

1,759,278

UNITED STATES PATENT OFFICE

HARRY C. RITTER, OF JERSEY SHORE, PENNSYLVANIA, ASSIGNOR OF ONE-HALF TO JOHN C. PATCHEN AND ONE-FOURTH TO D. B. JAFFE, BOTH OF JERSEY SHORE, PENNSYLVANIA

AIR-RESERVE TANK

Application filed November 23, 1926. Serial No. 150,296.

My invention relates to new and useful improvements in an air reserve tank, and has for its primary object the provision of means for carrying air under pressure in the individual cars for ordinary use to fill tires and thereby eliminate the use of a hand pump when at a distance from a service station or other place provided with a motor driven pump.

Another object of the invention is to provide an exceedingly simple and effective device of this character which may be readily used by any one ordinarily conversant with the inflating of automobile tires without the possibility of accident or damage to the tire being inflated, and the inflating being merely air under pressure, there is little likelihood that a tire will be inflated to such an extent that due to an increase in temperature, the tire would burst, as is always possible with the well-known liquid air inflators.

It is well known that when travelling in an automobile provided with pneumatic tires, that should a tire become deflated because of a puncture, blow-out, leaky valve, or any other cause, it is necessary to again inflate the tire after the damage, if any has occurred, has been repaired.

It is also well recognized that to inflate a tire requires considerable physical exertion or work when the ordinary pump is used, although when in the vicinity of a service station or other place having a motor driven pump, it is an easy matter to inflate a tire because the air tube only has to be connected with the tire valve and held long enough to obtain the desired pressure in the tire.

One of the objects of this invention is to overcome the disadvantages enumerated above and provide a tire inflator which may be used similarly to and having the advantages of the air systems of service stations.

A further object of this invention is to provide a tank adapted to hold air under pressure and having means by which connection may be made with the air supply tube or hose of a service station to fill the tank and also provide with means for connection with the tire valve in the same manner as the air hose of a service station is connected with such valve, and thereby permitting the inflation of a tire without any physical exertion other than the connection of the air hose of the tank with the tire valve.

A still further object of this invention is to provide in combination a tank, a handle at one end for transporting said tank, a stand on the opposite end or bottom of the tank, so that the latter may be supported in an upright position, said stand also acting as a guard for the filling and shut-off valves and other fittings with which the valves are connected, said filling valve being of the non-return type similar to the usual tire valve and connected with a T fitting, the latter having one of its passageways connected with a nipple communicating with the interior of the tank and said shut-off valve being connected to another passageway of the T fitting opposite the one to which the filling valve is attached, and in turn connected with a fitting, preferably an elbow, about which the flexible air hose is attached, and which latter carries an ordinary air chuck so that connection may be made with the tire valve.

With these and other ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:

Figure 1, is a side elevation of an air reserve tank constructed in accordance with my invention and having portions broken away and shown in section to illustrate details of construction.

Figure 2, is a section on the line 2–2 of Fig. 1 on a reduced scale.

In carrying out my invention as herein embodied, 2 represents a tank of any desirable shape and size, and including side or body walls 3 and an integral upper end wall or head 4. The bottom edge of the body wall is crimped or rolled inward for engagement with the flange 5 of the bottom end wall or head 6, which latter is preferably concavo-convex with the convex surface inward. In the center of the bottom wall or head 6 is formed an opening 7 surrounded by a hub 8, and in this opening is fixed one end of a nipple 9, while to the other or outer end of said nipple is connected a T-fitting 26, in such manner that two of the passageways in the opposite arms 26' and 26" of the T-fitting are longitudinally of the tank. To the third arm 26³ of said T-fitting is connected an air pressure gauge 27 so as to lie completely within the recessed bottom and for indicating the pressure within the tank.

A nipple 9' is mounted in the arm 26" of the fitting 26 and connected with the passageway in the arm 10' of another T-fitting 10 the latter being so positioned that the passageways in two of its arms 10" and 10³ are crosswise of the tank.

In one of the passageways of the fitting 10, as the passageway in arm 10³, is mounted a nipple 11, while to said nipple is connected a shut-off valve 12. This shut-off valve may be of any desirable or well-known construction and provided with a handle 13, by which the valve is manipulated.

To the side of the shut-off valve opposite the nipple 11 is attached an elbow 14, or other suitable fitting and to this is connected the coupling 15 on one end of the air hose 16, while the other free end of said air hose carries an air chuck 17, which is of usual well-known construction being the same as used at the present time on service station air hose, and is adapted to be slipped over the open end of a tire valve so as to permit the air from the tank to flow into the tire for inflating the latter.

In another of the passageways of the T fitting 10 as the passageway in arm 10" is mounted a non-return valve 18 similar to those used on pneumatic tires, and in order to protect this valve and prevent the entrance of dust, water and the like, it may be covered with a cap 19.

The tank may be supported in an upright position by a base 20 preferably in the form of a ring connected with the lower end of the tank by means of supports 21, each of the latter being formed from a strip of suitable metal bent upon itself midway of its length so as to partially encircle the base or ring 20, and then having portions paralleling each other intermediate its ends, while the free ends of the support portions are fashioned to provide jaws which engage the rolled or crimped edge of the tank, said jaws being held in firm contact by a suitable fastening device 22, herein illustrated as a screw and associated nut.

The ring or base and its support in addition to acting as a stand for the tank also performs the function of a guard for the valves and their associated fittings preventing them from coming in contact with objects which might damage them.

On top of the tank or on the end 4 are mounted lugs 23 in which is journalled a handle 24 so that the device may be readily transported from place to place, as when a tire is to be inflated or when the tank is to be filled with air under pressure.

In practice when it becomes necessary or desirable to fill the tank with compressed air, the cap about the non-return valve is removed, and the air hose from a service station connected with said valve 18 by means of the air chuck on said hose, thereby permitting air to be forced into a tank under pressure until the latter is charged to the desired pressure which will be indicated on the gauge 27.

When it becomes necessary to inflate a tire, the valve 12 is opened and the air chuck 17 on the hose 16 is placed over the tire valve, so that upon application of the necessary pressure by the operator, the air chuck valve will be opened and air will flow from the tank into the tire until inflated.

From experience I have learned that a tank of convenient size may be produced which when filled at a service station will hold sufficient air to inflate three large or six small tires and may be placed in some readily accessible part of the automobile without occupying any great amount of space.

Of course I do not wish to be limited to the exact details of construction as herein shown as these may be varied within the limits of the appended claim without departing from the spirit of my invention.

Having thus fully described my invention, what I claim as new and useful is:

An air reserve tank comprising, in combination, a receptacle having an inturned roll at one end, inlet and outlet valves at the same end as the roll, a base ring positioned at a distance from the end of the receptacle to which the valves are connected, supports, each constructed from a single strip of metal so fashioned as to provide a portion partially surrounding the base ring and parallel portions extending toward the tank and terminating in jaws corresponding to the shape of the end of the tank including the roll, and means to draw said jaws together to clamp the support on the tank.

In testimony whereof, I have hereunto affixed my signature.

HARRY C. RITTER.